United States Patent [19]

Tanaka et al.

[11] Patent Number: 5,680,267
[45] Date of Patent: Oct. 21, 1997

[54] DISK APPARATUS USED WITH A RECORDING MEDIUM HAVING CLOCK MARKS DETECTED BY CLOCK INTERPOLATION

[75] Inventors: Shoji Tanaka, Kanagawa; Toru Takeda, Saitama, both of Japan

[73] Assignee: Sony Corporation, Japan

[21] Appl. No.: 356,176

[22] PCT Filed: May 17, 1994

[86] PCT No.: PCT/JP94/00793

§ 371 Date: Feb. 27, 1995

§ 102(e) Date: Feb. 27, 1995

[87] PCT Pub. No.: WO94/27287

PCT Pub. Date: Nov. 24, 1994

[30] Foreign Application Priority Data

May 18, 1993 [JP] Japan .................. 5-116217

[51] Int. Cl.$^6$ .................................. G11B 5/09
[52] U.S. Cl. ............................ 360/51; 360/135
[58] Field of Search ...................... 360/73.03, 51, 360/48, 19.1, 70, 77.04, 31, 53, 40, 135; 324/212; 369/58, 275.3, 124

[56] References Cited

U.S. PATENT DOCUMENTS 5,276,564  1/1994  Hessing et al. ................... 360/51

*Primary Examiner*—Aristotelis M. Psitos
*Assistant Examiner*—Patrick Wamsley
*Attorney, Agent, or Firm*—Ronald P. Kananen

[57] ABSTRACT

Clock marks for sampling clock components have been formed in advance at constant intervals along the tracks of a disk recording medium and, when rotationally driving the disk recording medium, these clock marks are detected to sample clock components. By sampling the clock component from the clock marks thus formed at fixed periods and further generating an interpolation clock in a region between the clock marks on the basis of the sampled clock component, a very accurate clock can be obtained, as compared to the case in which a clock is sampled from reproducing code. Consequently, there can be realized a further large-capacity disk recording medium.

5 Claims, 10 Drawing Sheets

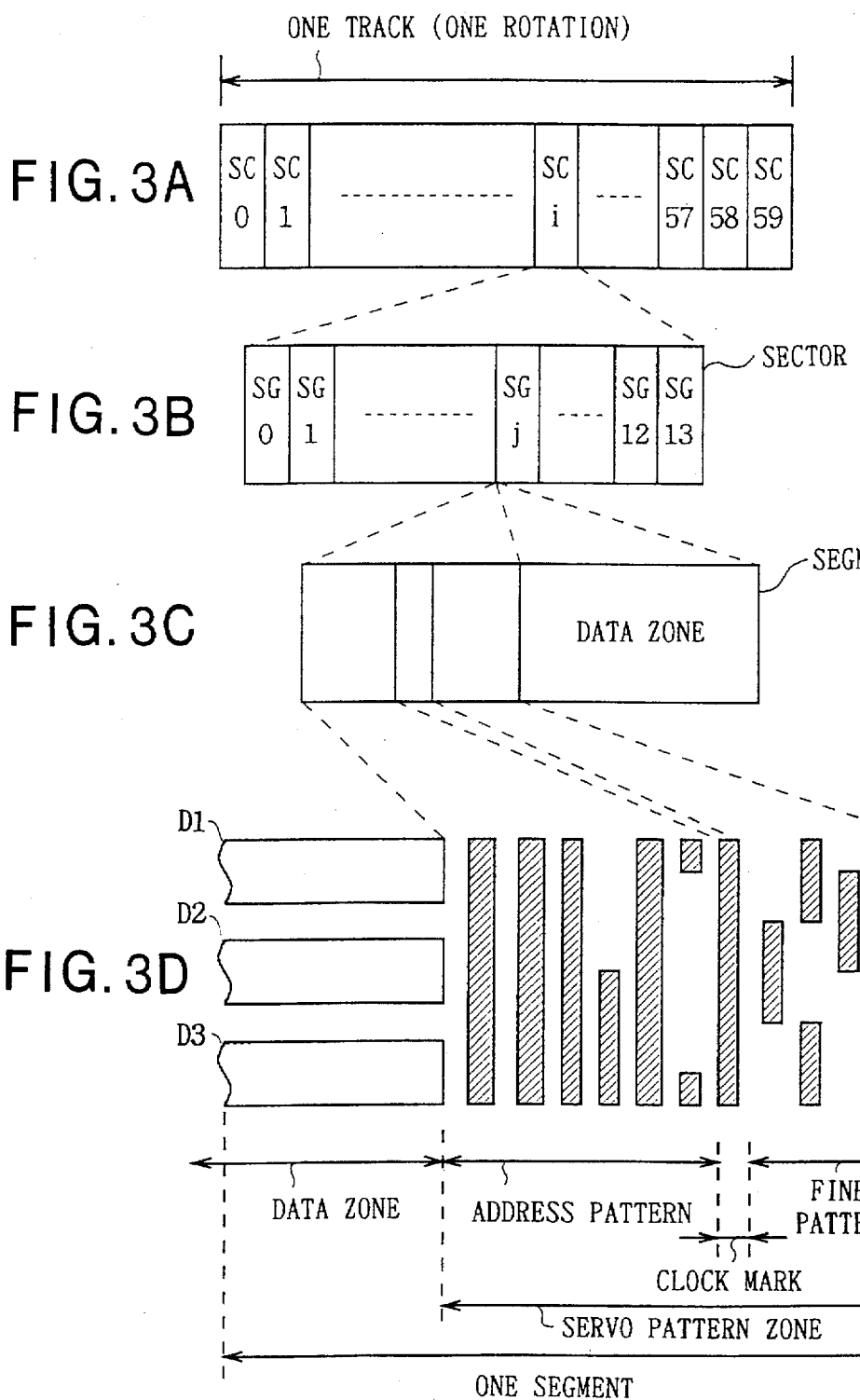

| DIAMETER | 64mm φ |
|---|---|
| GROOVE DEPTH | 0.2 μm |
| CLOCK WIDTH | 0.6 μm ~ 1.2 μm |

| CIRCUIT ELEMENT | | SEQUENCE NAME | PLL PHASE LOCK PROCESS | | ABSOLUTE ADDRESS LOCK OF COUNTER SYSTEM | | | |
|---|---|---|---|---|---|---|---|---|
| | | | STARTING ① | CLOCK DETECTION IMMEDIATELY AFTER FRAME MARK ② | CLOCK DETECTION OF ALL SEGMENTS ③ | HOME INDEX DETECTION ④ | NORMAL TIME ⑤ | RELEASE FROM LOCK ⑥ |
| PLL | | PHASE COMPARATOR | (RANDOM ERROR OUTPUT) | NORMAL OUTPUT | → | → | → | ABSOLUTE DECODING START OF FRAME MARK |
| | | VCO OUTPUT | (RANDOM ACCELE- RATION AND DECELERATION) | NORMAL INPUT | → | → | → | → |
| | | SAMPLING FREQUENCY | UNSTABLE | 3.6[KHz] | 50.4[KHz] | → | → | CLOCK DETECTION IMMEDIATELY AFTER FRAME MARK |
| | | ORIGINAL OSCILLATING FREQUENCY | FREE | FREE → 10.08[MHz] | 10.08[MHz] | → | → | |
| GATED CLOCK | | | UNSTABLE | POSITIVE 60 TIMES/LAP | POSITIVE 840 TIMES/LAP | FRAME SYNCHRONIZATION COMPLETION | → | |
| DISK-SURFACE ABSOLUTE- POSITION DETECTION COUNTER | | SYNCHRONIZING STATE | FREE RUN | FRAME SYNCHRONIZATION START | FRAME SYNCHRONIZATION COMPLETION | | | |
| | | FRAME RESET | | 60/LAP | 60/LAP | 60/LAP | 0 | |
| | | MASTER RESET | | 0 | 0 | 1/LAP | 0 | |
| SPINDLE | | | ACCELERATION (0 → 60[Hz]) | STEADY ROTATION | | | | |
| PREDICTIVE GATE | CLOCK | | OPEN | OPEN | OPEN | | OPEN | |
| | FRAME | | CLOSE | OPEN | | | OPEN | |
| | HOME INDEX | | CLOSE | CLOSE | | | OPEN | |

FIG. 12

DISK APPARATUS USED WITH A RECORDING MEDIUM HAVING CLOCK MARKS DETECTED BY CLOCK INTERPOLATION

TECHNICAL FIELD

The present invention relates to a disk apparatus, and is applicable to, for example, a hard-disk apparatus.

BACKGROUND ART

In the hard disk, each of a plurality of data recording areas (hereinafter referred to as tracks) concentrically arranged with respect to the center of the disk is divided into a plurality of blocks (hereinafter referred to as sectors), and data are divided and recorded on these sectors. In hard-disk apparatuses, there has been adopted a sector servo method as a servo method which is used in reading data from sectors.

This servo method asynchronously detects a servo header from each sector, locks phase-locked loop (PLL) output by means of a synchronous (SYNC) pattern and the like, and generates various types of timing signals based on the PLL output.

A gap region (redundancy signal region, etc.) of a specified length was therefore needed in front of a servo zone, as shown in FIG. 1.

However, this servo method, as shown in FIG. 2, has the problem that, while the position and the time near the head of the sector can be controlled relatively accurately, accurate control near the end (points P1 and P2 of the figure) of the sector becomes more difficult.

That is, since the sector servo method generates a synchronizing signal at a unit of several tens of sectors per one lap of the track, it cannot follow a change in the time axis such as a change in the rotation of the disk and cannot obtain the positions of as many as several ten thousands of bit units per one lap with a high degree of accuracy.

The number of regions to which servo information is given can be increased to solve this, but it is hard to improve the track density from the viewpoint of accuracy of writing because the sector servo method writes the servo information in units of sectors. Likewise, the position on the disk could not be fixed with a high degree of accuracy for this reason.

SUMMARY OF THE INVENTION

Considering the above points, the present invention provides a disk apparatus in which an angular position on the track can be specified with a high degree of accuracy without increasing the area occupied by servo information.

To solve such problems, the present invention includes a rotational drive means for rotating and driving a disk recording medium (2) having a plurality of clock marks (CM) formed in advance at constant intervals along recording tracks, a recording and/or reproducing means (3) for recording and/or reproducing desired data on/from the disk recording medium (2), and a clock interpolation means (5B, 5C) for detecting the plurality of clock marks (CM) appearing at definite periods from a reproducing signal (S2) reproduced by the recording and/or reproducing means (3), and for generating an interpolation clock (PLL clock) subdividing a time axis between the plurality of clock marks (CM) based on a clock component sampled from the plurality of clock marks (CM).

The clock component is sampled from a plurality of clock marks CM formed in advance at constant intervals along the tracks of the disk recording medium, and an interpolation clock (PLL clock) subdividing between clock marks (CM) is generated. Thus, the clock component is sampled based not on self-clock contained in reproducing code but on the physically formed clock marks (CM) having a definite period. By generating the interpolation clock (PLL clock) based on this, a very accurate interpolation clock (PLL clock) can be obtained. As a result, the absolute coordinate position on the disk recording medium 2 can also be fixed precisely.

BRIEF DESCRIPTION OF DRAWINGS

FIGS. 3(A) to 3(D) are schematic diagrams showing a data structure that is formed on a disk recording medium of the present invention;

FIG. 12 is a table explaining the operation sequence of the PLL circuit.

BEST MODE FOR CARRYING OUT THE INVENTION

Figure 1:
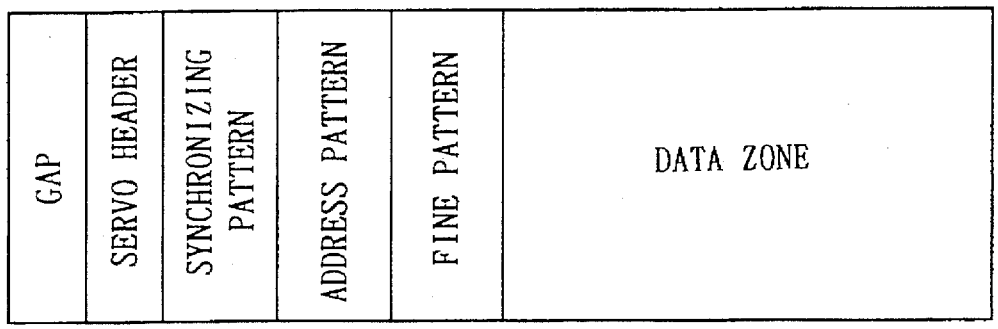
FIG. 1 is a schematic diagram showing a conventional sector structure.
Figure 2:
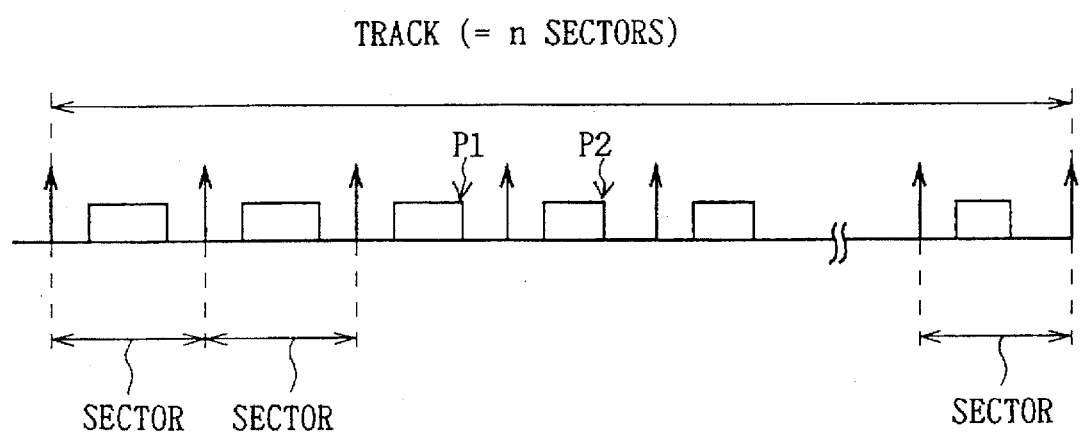
FIG. 2 is a schematic diagram explaining an asynchronous sector servo method.

An embodiment of the present invention will be described with reference to the accompanying drawings:

(1) Disk Recording Medium

It is assumed that a large number of clock marks has been formed in advance on a magnetic disk used in this embodiment, and this embodiment is made to constitute a very accurate synchronizing system by locking the PLL clock of a PLL circuit to the clock marks appearing at fixed periods after driving the disk. This servo method will hereinafter be referred to as a sampled servo method. This magnetic disk will also be referred to as a preembossed rigid magnetic (PERM) disk.

Incidentally, since the clock marks are spaced and not provided in the data areas, the clock components in the regions are generated by the PLL circuit that is operated in synchronization with the clock marks. At this time, unlike the case where a clock is generated from clock patterns asynchronously provided or the case where a clock is generated from a self-clock code array, the PLL clock that is output from the PLL circuit is obtained with a high degree of accuracy because it is generated based on a periodic clock permanent formed. Thus, arbitrary position coordinates on the disk can be determined accurately by synchronizing the PLL clock with the phase of the clock marks precisely formed in advance on the tracks of the magnetic disk.

(1-1) Format

Incidentally, even if the PLL clock corresponded to the magnetic disk, the absolute coordinates on the magnetic disk could not be fixed by only that PLL clock. To determine the absolute coordinates, it is necessary to fix a reference position appearing once for one rotation.

For this reason, special marks hardly appearing in data and clock marks are physically formed or written as home index marks on the magnetic disk.

In addition, frame synchronizing marks whose appearance frequency is higher than that of the home index marks are provided so that the PLL clock can be recovered to its locked state for a short period of time when the locked state of the PLL clock is released.

This structure will hereinafter be described on the data structure of the magnetic disk.

(1-1-1) Physical Disk Structure

A physical data structure that is provided in advance on the magnetic disk will first be described using FIG. 3.

The magnetic disk uses a three-hierarchy structure consisting of a plurality of tracks (FIG. 3(A)) arranged concentrically with respect to the center of the magnetic disk, a plurality of sectors (FIG. 3(B)) constituting the track, and a plurality of subblocks (FIG. 3(C)) constituting the sector. The subblocks will hereinafter be referred to as segments.

Among these, the segment is the minimum unit on the servo format. One segment consists of a servo pattern zone (address pattern, clock mark, and fine pattern) and a data zone (FIGS. 3(D)). The length of each segment is equal to two hundred PLL clocks (each of which is a minimum clock that is generated from a clock mark and each of which is given at a data bit rate). One sector consists of 14 segments, and one track consists of 60 sectors. Therefore, one track (one rotation) consists of 840 (=14×60) segments.

Thus, the lattice point of the angular coordinates on the magnetic disk can be given by detecting the clock marks respectively recorded on the 840 segments. That is, a virtual rotary encoder is constituted by synchronizing the PLL clock with the clock mark. Note that, the sector and segment used in this embodiment are a format of marks physically formed, and are not always identical with logic sectors used when data is written.

It is also assumed in this embodiment that, as with the clock marks, all of the address patterns and the fine patterns constituting the servo pattern zone have also been formed at the time of manufacturing.

(1-1-2) Structure of Servo Pattern Zone

The absolute coordinates of the magnetic disk formed in a physical format such as this can be specified by the servo patterns provided on the magnetic disk as follows:

Each of 60 sectors appearing on one track (one lap) is made so that the starting position thereof can be detected by a special pattern of the servo pattern zone recorded on the head segment of each sector.

For this special pattern there is a home index mark appearing once for one rotation and a frame synchronizing mark appearing 59 times for one rotation.

Figure 4A:
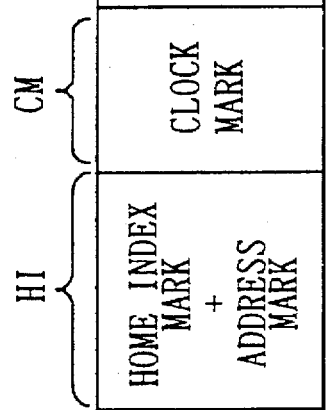
FIGS. 4(A) to 4(C) are schematic diagrams explaining a hierarchical data structure in the servo pattern zone.

The head segment of the sector in which the home index mark is provided will first be described. This segment is called a home index segment and has the data structure shown in FIG. 4(A). The concrete pattern example of the data structure is shown in FIG. 3(D1). To an address pattern of this home index segment are written a home index mark and an address mark. A reference position and a track number on the track can be identified by these marks.

Figure 4B:
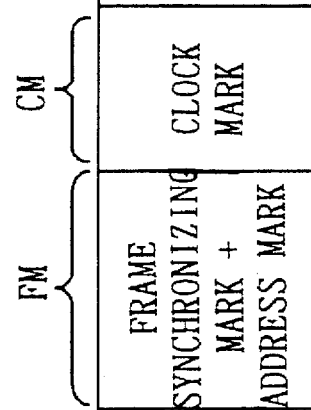

On the other hand, the head segment of the sector in which the frame synchronizing mark is provided is called a frame synchronizing segment and has a data structure shown in FIG. 4(B). The concrete pattern example of the data structure is shown in FIG. 3(D2). On this frame synchronizing segment, a frame synchronizing mark and an address mark are written as an address pattern. A starting position and a track number of each sector can be identified by these marks.

Each of the home index segment and frame synchronous segment is called a header segment.

The other segments are called plain segments and discriminated from the header segment. These plain segments are 13 segments following the home index segment and 13 segments following each frame synchronizing segment. That is, each sector comprises a single header segment and 13 plain segments.

Figure 4C:
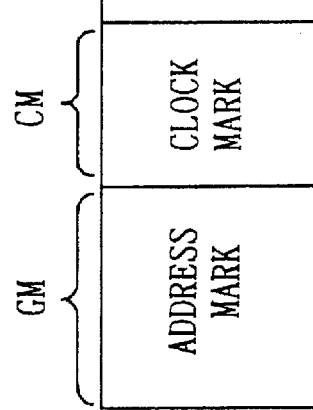
Figure 5:
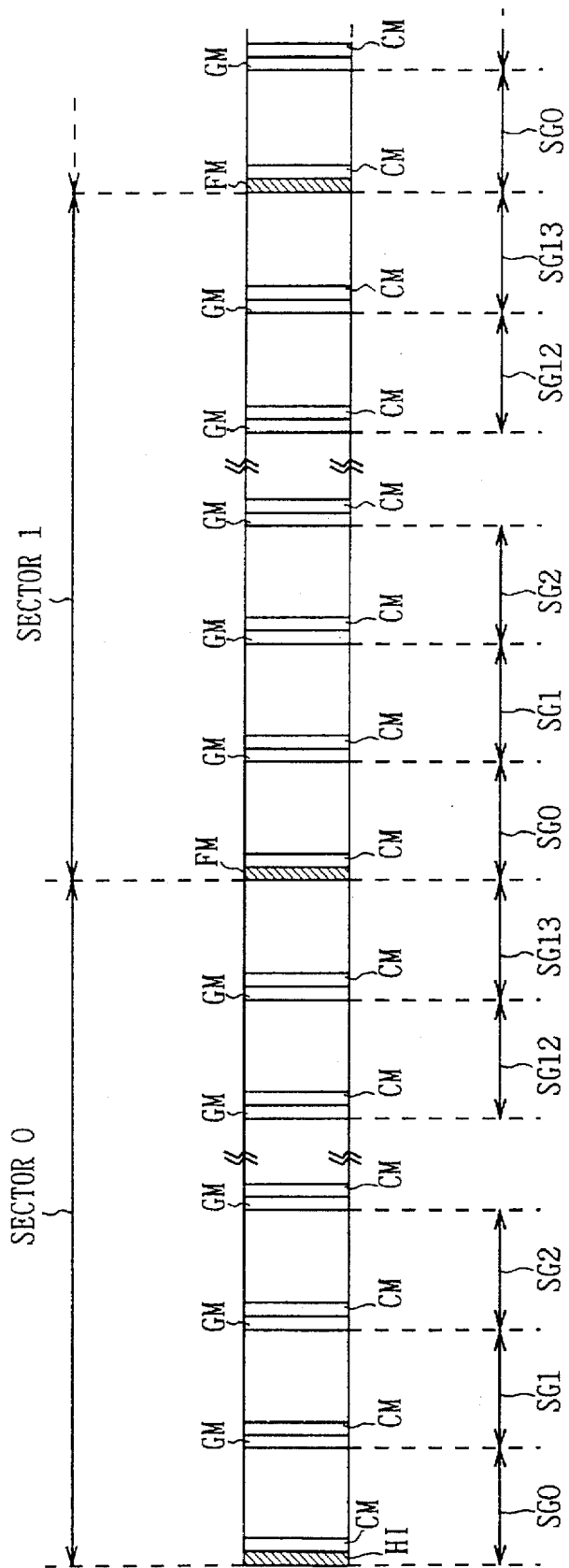
FIG. 5 is a schematic diagram explaining the array of segments constituting a sector.

The data structure of each plain segment is shown in FIG. 4(C). The concrete pattern example is shown in FIG. 3(D3). An address code is written as an address pattern on this plain segment so that the track number can be identified.

If part of a single track on the magnetic disk in which the physical segments have been formed is expressed with this relationship, it will become as shown in FIG. 4.

Hence, only clock mark CM of the patterns constituting the servo pattern zone is used to synchronize the PLL clock, and the address pattern is used to specify the coordinates. Also, only when the address pattern and the fine pattern are applied to the magnetic disk apparatus, there are some cases in which they are used for other purposes.

(1-1-2-1) Functions of Individual Marks

As described in the foregoing paragraph, the servo pattern zone is constituted of a combination of a plurality of patterns. In this paragraph, the functions of each pattern including the already described patterns will be described in detail.

First, the home index mark is a signal for determining the reference position of the track. That is, this mark fixes a 0-th sector among 60 sectors on each track and indicates the start (R–θ coordinate origin) of the track. R represents a radius direction, and θ represents angular coordinates. This home index mark is not provided in the plain segments.

On the other hand, the frame synchronizing mark is a signal representative of the starting position of each sector. The mark represents the head segment of each of first, second, ..., and 59th sectors. When the PLL clock is locked as the magnetic disk is driven, the frame synchronizing mark also functions as a mark for finding the clock mark. The home index mark also does the same function. The frame synchronizing mark is not provided in the plain segments.

The address mark, which constitutes the address pattern together with these two types of marks, is a mark for obtaining rough address information (track number) and is provided in all of the segments. An 18-bit Gray code is used to represent this data.

Clock mark CM is also a mark for notifying the circuit system of coordinate information together with the rotational phase of the magnetic disk. A single clock mark is provided in each segment. In a magnetic disk made on an experimental basis, the length of one PLL clock is assigned to clock mark CM.

Further, the fine pattern is a signal for obtaining information on a position being within one track and comprises four marks X, Y, A, and B (FIGS. 3(D1) to 3(D3)). The fine pattern is provided in all of the segments. These patterns are formed as one island for one PLL clock. The length in the radial direction is equal to the track pitch and the array is a four-phase zigzag pattern used in the sector servo method.

(1-1-3) Trial Example

Figures 6, 11:
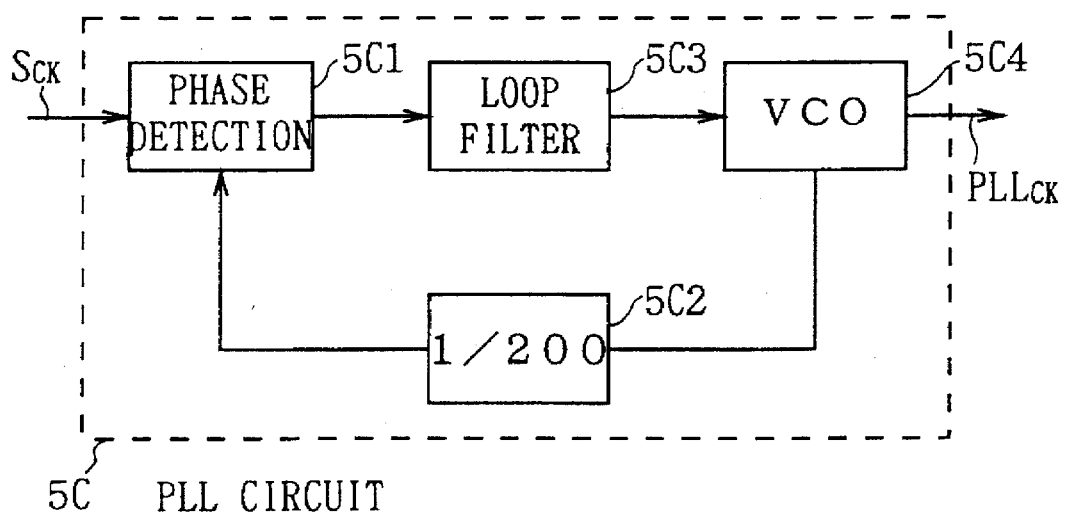
FIG. 6 is a table showing the dimensions of elements forming a clock mark.
FIG. 11 is a block diagram showing the constitution of the PLL circuit.

The magnetic disk was made on an experimental basis by forming the necessary concavities and convexities on a glass substrate by etching, and then depositing a magnetic film over the whole of the disk by sputtering. Hence, each mark section is formed into a concave shape, and the section other than the mark section (corresponding to a "sea") is formed into a convex shape. The dimensions of the formed disk are shown in FIG. 6. In the trial example, the minimum mark length on the innermost circumference (radius 15.5 [mm]) of the disk is 0.6 [μm] and the minimum mark length on the outermost circumference (31 [mm]) is 1.2 [μm].

Figure 7:
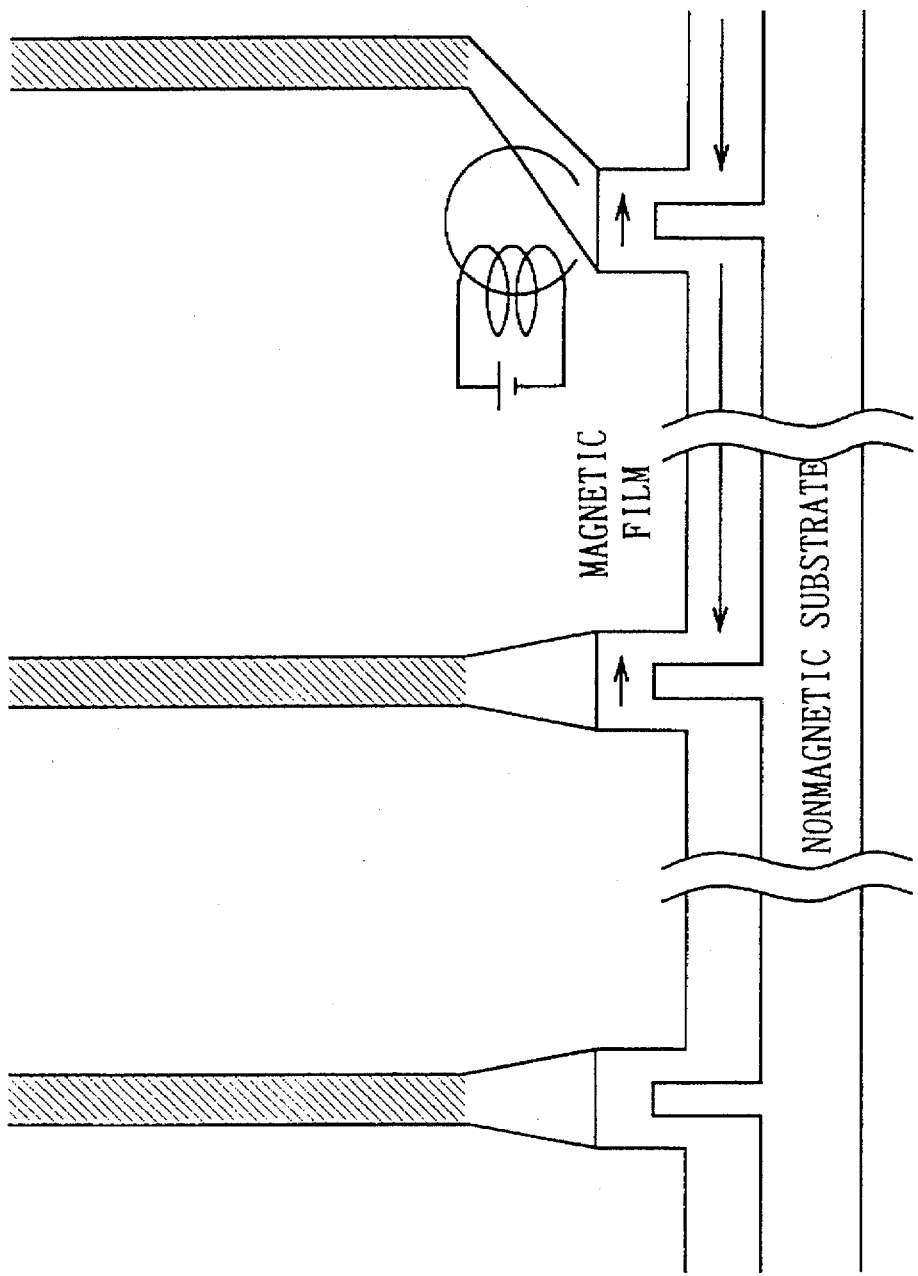
FIG. 7 is a schematic diagram explaining a method of magnetizing a disk-shaped recording medium.

After the concave and convex portions have thus been formed, the magnetic disk was made by DC-magnetizing it using a magnetic head so that the magnetized directions of the concave and convex portions become opposite. The mark output signal is detected by the magnetic head. A method of magnetizing the concave and convex sections is shown in FIG. 7. The concrete magnetization method is described in Japanese Patent Application No. 217935/1992 by the present applicant.

The frame synchronizing mark, the home index mark, and the clock mark CM, which are also formed with these concavities and convexities, are arranged so that, even if the magnetic disk apparatus were in a seek operation, these marks could be detected to hold the locked state of the PLL circuit. That is, these marks are a continuous pattern on the traveling locus (locus of rotational movement) of the magnetic head so that, even if the magnetic head was in any position on the magnetic disk, they could be detected.

Therefore, the frequency of the clock marks that are reproduced from the magnetic disk described in this embodiment becomes 50.4 [ks/sec] when the number of rotations of the disk is 3600 [rpm] (i.e., 60 [Hz]). Also, since a signal that is synchronized to this clock signal is a signal that is 200 times the frequency of the PLL clock, the oscillating frequency of the PLL clock becomes 10.08 [MHz].

(1-2) Advantages of the Embodiment

According to the constitution described above, all of the segments are recorded not by the same patterns but by hierarchical servo patterns appearing at a hierarchical appearance probability, so that the rate of the servo area occupying one track length can be relatively reduced as compared to the case where the same patterns are recorded for all of the segments. For example, the frame synchronizing pattern is one-fourteenth the appearance probability of the clock mark. Therefore, if the servo pattern is formed by this method, the occupied rate of the servo pattern length to one track length can be reduced to about 10%. Thus, the occupied area can be compressed as compared to the case of the synchronizing pattern being used for each segment. Further, in the magnetic disk, the bit length of the embossed system becomes several times a data recording bit waveform, as compared to a magnetically recorded bit wavelength, and therefore this effect is large.

In addition, since the clock components reproduced from this magnetic disk are obtained from the clock marks that have physically been provided in advance, the rotational information of the magnetic disk can be obtained with fidelity, and a virtual rotary encoder of a complete synchronizing system can be formed easily.

(2) Magnetic Disk Unit (2-1) Constitution of Magnetic Disk Unit

Figure 8:
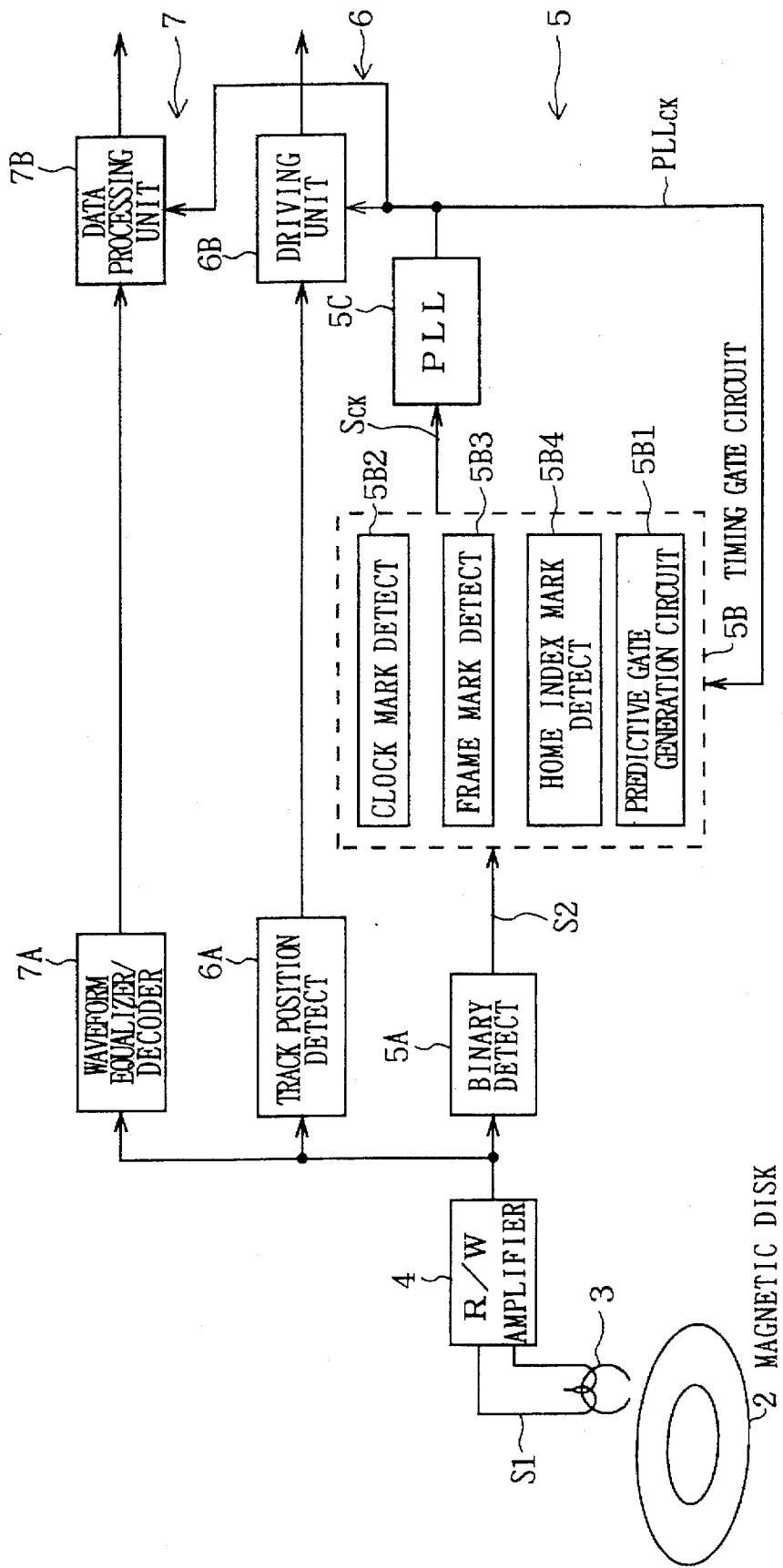
FIG. 8 is a block diagram showing an embodiment of a disk apparatus.

In FIG. 8, 1 denotes a magnetic disk apparatus. It is assumed that all of the clock marks have been formed in advance on a magnetic disk 2 that is reproduced by the magnetic disk apparatus 1, and data has been recorded by partial response (PR) code. The magnetic disk apparatus 1 reads from a magnetic head 3 a reproducing signal S1 corresponding to a magnetization pattern recorded on the magnetic disk 2 and sends it to a read/write amplifier 4. Hence, in this embodiment, the magnetic head 3 comprises a magneto resistive (MR) inductive composite thin-film magnetic head.

The read/write amplifier 4 amplifies the reproducing signal S1 and gives it to a sampled servo system 5, tracking servo system 6, and a signal processing system 7.

Here, the tracking servo system 6 detects a relative positional relationship in the radius direction between the magnetic head 3 and the track by means of a track position detection circuit 6A, and controls a drive part 6B so that the magnetic head 3 can run on the track accurately.

The signal processing system 7 also decodes recorded data by means of a waveform equalizer/decoder 7A from the reproducing signal S1 reproduced from the data area, and the decoded data is signal processed by means of data processing part 7B. Hence, in the decoding operation in the waveform equalizer/decoder 7A there is employed a maximum likelihood sequence estimation.

(2-1-1) Constitution of Sampled Servo System

The constitution of the sampled servo system 5 will next be described using FIGS. 8 to 11.

The sampled servo system 5 is constituted of a binary detection circuit 5A for converting the reproducing signal S1 into a binary signal S2, a timing gate circuit 5B for sampling a clock component from the binary signal S2, and a PLL circuit 5C that operates, as a reference signal, the clock component that is given by the timing gate circuit 5B.

(2-1-1-1) Constitution of Timing Gate Circuit

The timing gate circuit 5B is made to operate, as a reference clock, a PLL clock that is output from a PLL circuit 5C, and made to predict the timing at which the clock mark, the frame synchronizing mark, and the home index mark appear, based on the PLL clock, and generate a timing gate signal.

This circuit part is a predictive gate generation circuit section 5B1.

Figure 9:
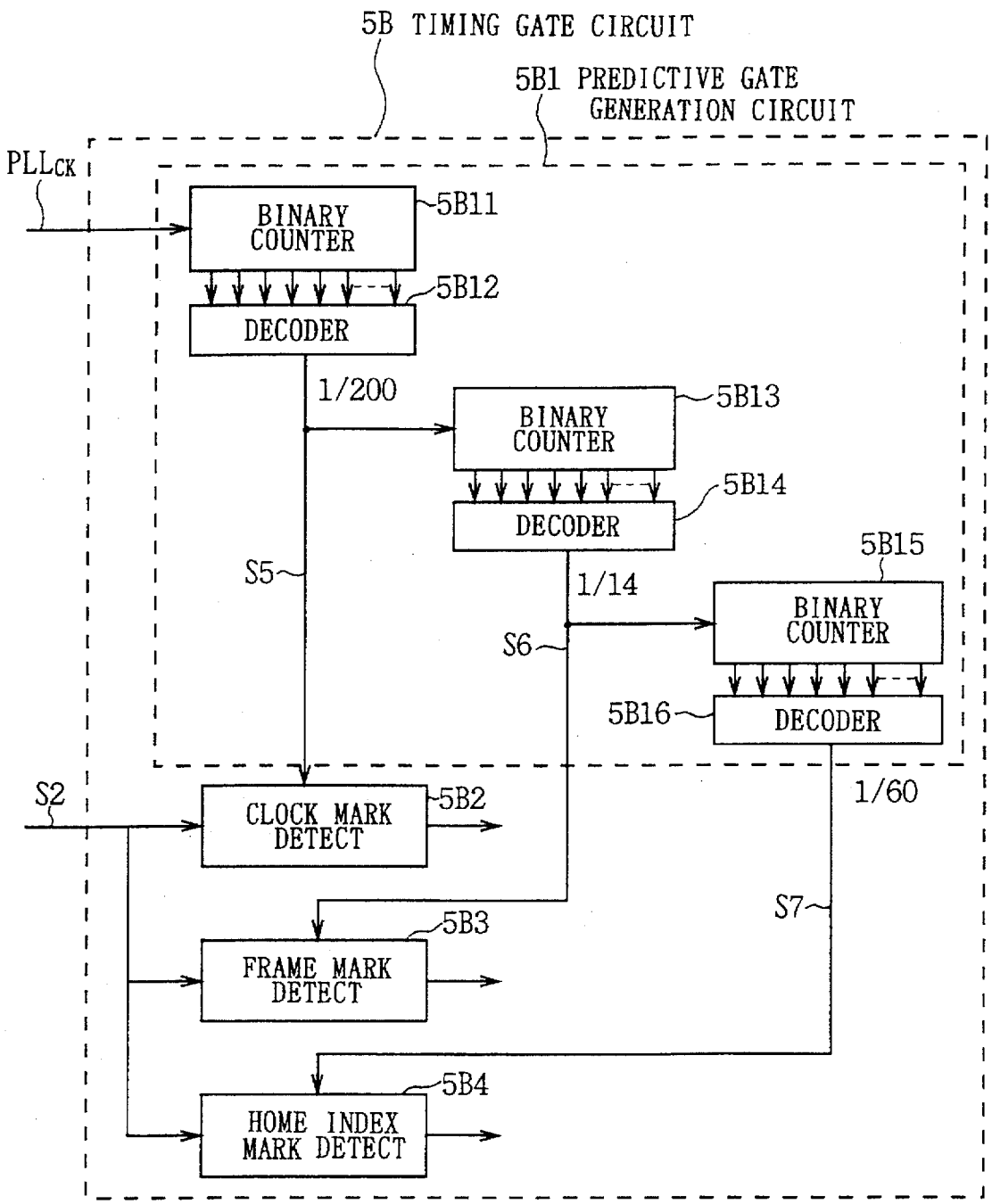
FIG. 9 is a block diagram showing the constitution of the predictive gate generating circuit.
Figure 10:
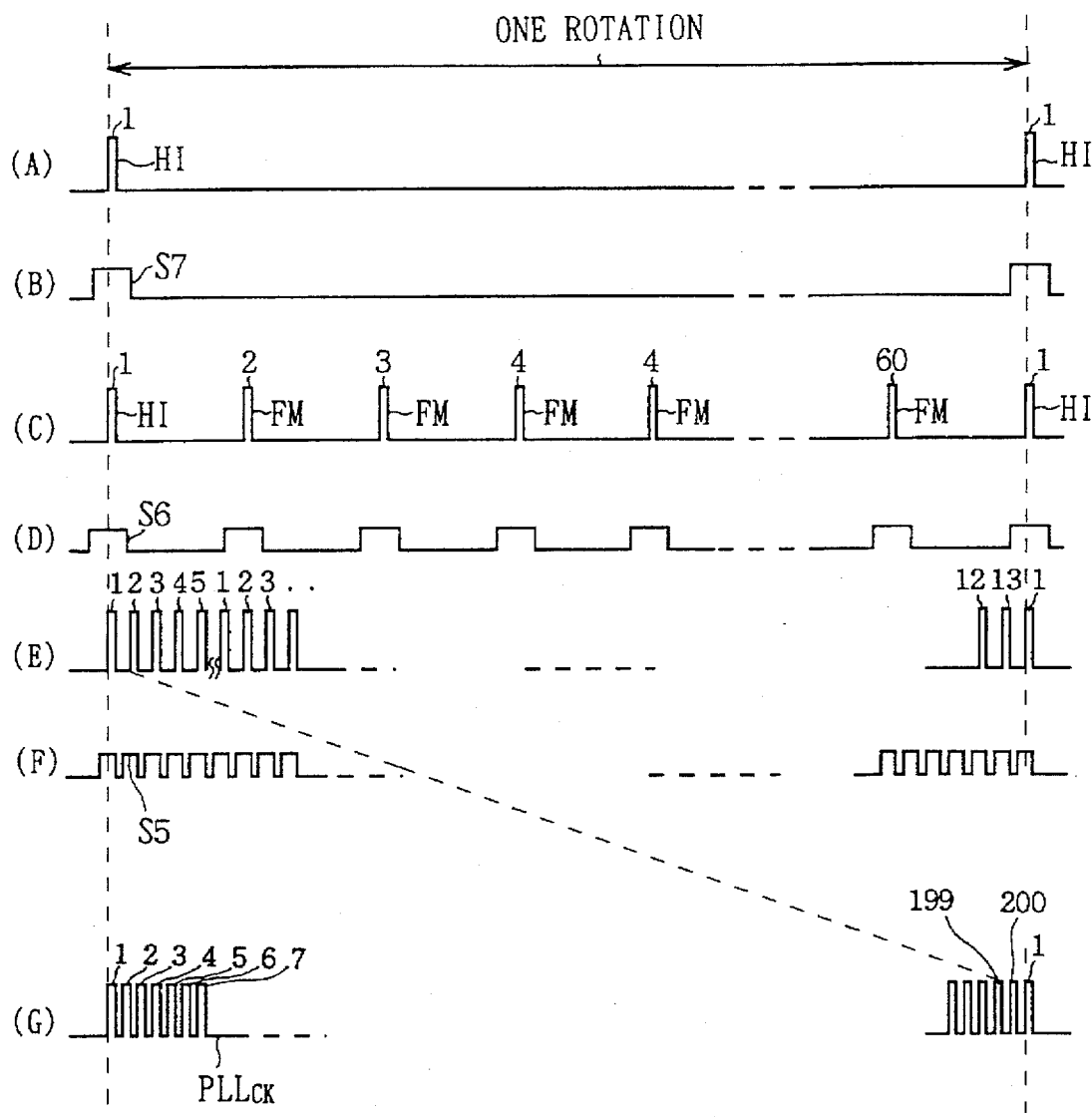
FIG. 10 has timing charts (A) to (G) explaining detection timings of the PLL output, the clock mark, the frame synchronizing mark, and the home index mark.

As shown in FIG. 9, the predictive gate generation circuit section 5B1 is constituted of three gate stages of a timing gate stage (binary counter 5B11 and decoder 5B12) for predicting the appearance of a clock mark and generating a timing gate signal, a timing gate stage (binary counter 5B13 and decoder 5B14) for predicting the appearance of a frame synchronizing mark and generating a timing gate, and a timing gate stage (binary counter 5B15 and decoder 5B16) for predicting the appearance of a home index mark and generating a timing gate.

First, the predictive gate generation circuit 5B1 inputs a PLL clock shown in FIG. 10(G) to the binary counter 5B11 constituting the timing gate stage for a clock mark and counts the number of clocks. The decoder 5B12 outputs timing gate signal S5 each time the counter value of the binary counter 5B11 reaches 200. Thereby, a timing gate signal S5 that is 200 times the frequency of the PLL clock is obtained as shown in FIG. 10(F).

Clock mark detection circuit 5B2, when reproducing signal S1 corresponding to the clock mark is input during the time timing gate signal S5 is rising, outputs this as a gated clock signal (FIG. 10(E)). Of course, there are a few clock marks CM that are found during the time the PLL clock is not synchronized with the clock mark CM.

Employing timing gate signal S5 in this way is for preventing a false clock component included in the reproducing signal S1 from being detected as a clock signal CM by mistake, and for sampling only a clock component corresponding to a true clock mark.

Further, the gate width of the timing gate signal S5 has been set to be slightly wider than the pulse width of the reproducing signal S1 obtained from the clock mark CM. Thereby, when a clock component corresponding to the clock mark CM becomes near to the phase of the PLL clock, it is made to be pulled quickly into a locked state.

Incidentally, after starting, it is difficult to lock the phases of all of the clocks abruptly to obtain the absolute coordinates. The magnetic disk apparatus 1 therefore operates so that the frame phase is first locked on the frame synchronizing mark and the home index mark which appear at the same rate as the period of rotation of the spindle motor and at the frequency of one-fourteenth of clock mark CM. For this reason, the predictive gate generation circuit 5B1 predicts the appearance of the mark (i.e., frame synchronizing mark and home index mark) of the head segment of the sector and generates timing gate signal S6 (FIG. 10(D)). The magnetic disk apparatus 1 shifts from within the period given by the timing gate signal S6 to an operation of detecting the frame synchronizing mark.

The timing gate signal S5 predicting the clock mark is first input to the binary counter 5B13 to count the number of clocks. Next, timing gate signal S6 predicting the timing at which the frame synchronizing mark that is 14 times the counted value will be detected, is generated. The timing gate signal S6 is applied from the decoder 5B14 to a frame mark detection circuit 5B3. The frame mark detection circuit 5B3 counts the number of the frame synchronizing marks or the home index marks within the period given by the timing gate signal S6, determines the frame phase to be locked if 60 marks are found per one rotation and outputs the frame mark signal, and resets the frame value of the counter of a disk-surface absolute-position detection counter.

If the frame phase is locked by these operations, all of the gated clocks will be detected. Then, timing gate signal S7 (FIG. 10(B)) predicting the appearance of the home index mark is generated at a predictive gate generation circuit 5B1 to detect the home index segment appearing at a frequency of 1/60 with respect to the sector.

At this time, a binary counter 5B15 inputs therein the timing gate signal S6 predicting the frame synchronizing mark, to count the number of clocks. A decoder 5B16 sends a signal that is 60 times this counted value to a home index mark detection circuit 5B4 as timing gate signal S7 predicting the home index mark. If the home index mark is detected at this timing (FIG. 10(A)), the home index mark detection circuit 5B4 outputs the home index signal and resets the master reset terminal of the disk-surface absolute-position detection counter. Thereby, an address completely synchronized with the rotating magnetic disk is generated at the disk-surface absolute-position detection counter.

(2-1-1-2) Constitution of PLL Circuit

Hence, a PLL circuit 5C constituting the sampled servo system is constituted as shown in FIG. 11. The PLL circuit 5C inputs gated clock signal $S_{CK}$ output from the clock mark detection circuit 5B2 to phase comparator 5C1, to compare its phase with the phase of the output of divider 5C2. A loop filter 5C3 applies a DC voltage proportional to the difference in phase between the two signals to a voltage-controlled oscillator (VCO) 5C4 so that the PLL clock is locked on gated clock $S_{CK}$.

(2-2) PLL Operation

In the above-described constitution, the reproducing operation of the magnetic disk apparatus 1 will be described on the servo operation of the sampled servo system 5.

If the loop constant of a loop filter 5C3 constituting the PLL circuit 5C is designed to be a suitable value, the spindle motor will start and also the PLL circuit 5C will start following. After the rotation of the spindle motor has reached a steady rotation (60 [Hz]), it is expected that the oscillating frequency of the PLL circuit 5C will reach a steady state.

However, in the case of this embodiment, the PLL clock is locked on the clock mark on the magnetic disk further reliably and quickly by operating the PLL circuit 5C in the following sequences:

These series of sequences by the magnetic disk apparatus 1 will be described using FIG. 12.

The operating condition of the PLL circuit 5C immediately after starting is not fixed, and a phase comparator 5C1 and a voltage-controlled oscillator 5C4 are both operating unstably. That is, the phase comparator 5C1 outputs random errors and the voltage-controlled oscillator 5C4 runs freely. At this time, in the timing gate circuit 5B, only clock mark detection circuit 5B2 is operating based on the PLL clock.

At this time, reproducing signal S1 sampled by timing gate signal S5 is to be output by the clock mark detection circuit 5B2 to the PLL circuit 5C, but, at this point in time, in most cases, gated clock SCK does not contain the clock component corresponding to the clock mark CM.

Further, the counter value of the counter applying the absolute position on the disk is also unfixed.

If the number of rotations of the spindle motor soon comes near the steady rotational frequency (60 [Hz]), some of gates clock signals $S_{CK}$ obtained from the clock mark CM immediately after the frame synchronizing mark and the outputs of the voltage-controlled oscillator 5C4 of the PLL circuit 5C will reach a normal phase relation, and the phase comparator 5C1 will normally operate only immediately after the frame synchronizing mark FM.

Therefore, the oscillating frequency of the voltage-controlled oscillator 5C4 becomes pulled into the normal phase at a frequency of about 60 times per rotation (frame synchronizing mark detection process), and the oscillating frequency of the voltage-controlled oscillator 5C4 begins to approach the normal phase. After the end of this process, the oscillating frequency of the voltage-controlled oscillator 5C4 reaches (process of detecting all clocks) a normal frequency (10.08 [MHz]).

When the oscillating frequency of the PLL circuit 5C4 reaches the normal frequency in this way, the total number of gated clocks $S_{CK}$ (840 clocks) will be detected correctly from the track being scanned and both the phase comparator 5C1 and the voltage-controlled oscillator 5C4 will be controlled at a frequency of 50.4 [KHz].

As the control points are thus increased, the phase relation of the PLL clocks that are output from the voltage-controlled oscillator 5C4 is held in a close relationship to the clock phase of the magnetic disk. However, in the stage, only the PLL clock is locked and the state (or frame phase) of the address decoder counter is unfixed.

If it is detected that the phase relationship has become a close relationship, the frame synchronizing mark signal is applied to the reset terminal of the disk-surface absolute-position detection counter and the counter enters a frequency state in which it rotates 60 times per lap of the magnetic disk. The frame phase is fixed for this reason. That is, the state arises in which the clocks of all of the segments were found.

However the origin position of the track arranged on the magnetic disk still remains unfixed.

Then, if frame synchronization is identified from the number of clocks that is output from the frame mark detection circuit 5B3 to which the timing gate signal predicting the frame synchronizing mark FM is inputted, the timing gate predicting the home index mark is opened, and complete synchronization is detected by applying the home index signal passed through this predictive timing gate to the master reset terminal, and the PLL clock is shifted to the steady state. That is, the PLL clock that has been phase-locked in bit order is obtained.

In addition, there are some cases in which the synchronization state is seldom lost by the seek operation and the like, but in a case where there is a means for detecting that synchronization is lost, the PLL clock can automatically be pulled into resynchronization state by returning to any one of the above-described series of sequences (starting, clock detection immediately after frame mark, clock detection of all segments, and home index detection) in accordance with the state in which synchronization was lost.

As a result, there is obtained a precise servo clock following the substrate coordinate system of the magnetic disk accurately. Incidentally, after reaching the locked state, this clock is used in the timing control of the servo system and the signal processing system within the magnetic disk apparatus. Once locked, there will no possibility that the locked state would be lost even if several of the clock marks were lost, and the servo clock can keep generating accurate timing.

However, since the magnetic disk that is formed is attached to the spindle motor, there exists eccentricity and therefore there are cases in which the time interval of the clock marks reproduced from the magnetic disk changes according to the radial vibrations. If this change remains as is, the phase shift with the servo lock become a residual difference. For this reason, a quantity of eccentricity measured in advance is applied to the PLL circuit 5C to absorb the phase shift.

If the PLL clock enters the locked state, the integration timing, the sample hold timing, and the address decode timing will be output accurately to the position signal generation section. The servo operation is performed by using the position signal obtained in this way.

(2-3) Advantages of the Embodiment

According to the above-described arrangement, a series of sequences for synchronizing the PLL clock of the PLL circuit to the clock mark of the magnetic disk is divided into hierarchical multiple stages, so the phase can be pulled quickly into the locked state, as compared to the prior art.

Particularly, when high-speed access to a plurality of magnetic disks is frequently required like a hard disk, shortening the time for a shift to this synchronization state is noticeably effective.

Also, since a shift state to the locked state can be performed in multiple stages, a return operation to the locked state would not need to be repeated from the initial state even if the locked state were lost and therefore a shift to the locked state can be shortened.

Further, there also occurs the advantage that the self-locking of the signal processing system can be made unnecessary. This is not always necessary in a servo system, but it is effective particularly in a method combining partial response coding and maximum likelihood decoding, such as a conventional signal processing method in which self-locking is hard to sample, compared to a combination method of 1–7 or modulation and peak detection.

(3) Other Embodiments

The above-described embodiment has been set forth with relation to a magnetic disk and a magnetic disk apparatus. However, the present invention is not only limited to this, but may be applied to optical disks and optical disk apparatues. The same effect as the above-described embodiment can also be obtained. In addition, the invention is also applicable to optical magnetic disks and optical magnetic disk apparatuses and the same effect as the above-described embodiment can be obtained.

Further, in the above-described embodiments, the magnetic head comprises an MR head, but it may also be applied to other high-density heads. In addition, it may also be applied to the case of an optical pickup.

Further, in the above-described embodiments, the clock marks have been formed in advance as embossed marks, but they do not always need to be recorded as embossed marks, and the present invention is not only limited to this, but they may also, be recorded magnetically.

Further, in the above-described embodiments, one track comprises 60 sectors, one sector comprises 14 segments, and one segment is a 200-clock length: However, the present invention is not only limited to this, but these may also take other numerical values.

Further, in the above described embodiments, the physical structure of one track is a three-level structure (track: sector, segment). However, the present invention is not only limited to this, but it may also be applied to a four- or more-level structure. Likewise, while there has been described the case in which the structure of the servo pattern is a three-level structure (home index mark+address mark, frame synchronizing mark+address mark, address mark), the servo pattern may also be applied to a four- or more-level structure.

Industrial Applicability

The present invention is applicable particularly to a disk apparatus that reads and/or reproduces data from disk recording medium:

We claim:

1. A disk apparatus for recording and/or reproducing desired data on/from a disk recording medium, comprising:

rotational drive means for rotationally driving said disk recording medium which comprises a plurality of recording tracks, each of which comprises a plurality of sectors, each of which comprises a plurality of segments, each of which having a clock mark, resulting in a plurality of clock marks formed in advance at constant intervals along said recording tracks wherein each of said plurality of sectors comprises a single header segment and a plurality of plain segments wherein a home mark is disposed on one of the header segments of respective sectors on the recording track and a frame mark is disposed on other header segments of said plurality of sectors;

recording and/or reproducing means for recording and/or reproducing desired data to/from said disk recording medium; and clock interpolation means for detecting the plurality of clock marks appearing at fixed periods from a reproducing signal reproduced by said recording and/or reproducing means, and for generating an interpolation clock subdividing a time axis between said plurality of clock marks based on a clock component sampled from the plurality of clock marks, wherein said clock interpolation means includes means for detecting the clock mark, means for detecting the frame mark in accordance with the detected clock mark and means for predicting the home mark from the detected frame mark and the detected clock mark to synchronize in rotation said rotational drive means;

wherein said clock interpolation means comprises: a PLL circuit for outputting a PLL output used as said interpolation clock; a counter for counting the number of clocks of said PLL output, and a decoder for generating a gate signal for sampling said clock component from said disk recording medium by decoding the counted value.

2. The disk apparatus according to claim 1, wherein said disk recording medium is a magnetic disk.

3. The disk apparatus according to claim 2, wherein said plurality of clock marks is magnetically recorded.

4. The disk apparatus according to claim 1, wherein said plurality of clock marks is an embossed type.

5. The disk apparatus according to claim 4, wherein said clock interpolation means feedforward-compensates for said interpolation clock according to the quantity of eccentricity of the disk measured in advance.

* * * * *